(12) United States Patent
Kosaka et al.

(10) Patent No.: US 10,710,141 B2
(45) Date of Patent: Jul. 14, 2020

(54) VEHICLE BODY COMPONENT, MANUFACTURING DEVICE OF THE SAME, AND MANUFACTURING METHOD FOR THE SAME

(71) Applicant: TOYOTA JIDOSHA KABUSHIKI KAISHA, Toyota-shi, Aichi-ken (JP)

(72) Inventors: Naoya Kosaka, Miyoshi (JP); Hideki Asadachi, Toyota (JP); Taichi Yamaguchi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 15/104,178

(22) PCT Filed: Dec. 23, 2014

(86) PCT No.: PCT/IB2014/002875
§ 371 (c)(1),
(2) Date: Jun. 13, 2016

(87) PCT Pub. No.: WO2015/097541
PCT Pub. Date: Jul. 2, 2015

(65) Prior Publication Data
US 2016/0361747 A1    Dec. 15, 2016

(30) Foreign Application Priority Data

Dec. 27, 2013  (JP) .................................. 2013-271870

(51) Int. Cl.
*B21D 35/00*    (2006.01)
*B21D 53/88*    (2006.01)
(Continued)

(52) U.S. Cl.
CPC ........... *B21D 35/006* (2013.01); *B21D 22/06* (2013.01); *B21D 53/88* (2013.01); *B21J 5/08* (2013.01); *B21K 23/00* (2013.01); *B62D 25/00* (2013.01)

(58) Field of Classification Search
CPC ........... B21C 37/02; B21D 5/01; B21D 11/02; B21D 35/006; B21D 22/06; B21D 53/88; B21D 3/16; B21J 5/08
(Continued)

(56) References Cited

U.S. PATENT DOCUMENTS 9,421,597 B2 * 8/2016 Yamamoto ............ B21K 21/16
2007/0125149 A1   6/2007 Yoshitome et al.

FOREIGN PATENT DOCUMENTS

DE  10 2007 013174 A1   9/2008
JP  S5691624 U         7/1981
(Continued)

OTHER PUBLICATIONS

Written Opinion of the International Searching Authority for International Application No. PCT/IB2014/002875.*
(Continued)

*Primary Examiner* — Christopher J Besler
(74) *Attorney, Agent, or Firm* — Oliff PLC

(57) ABSTRACT

In a vehicle body component, a bent portion that is formed in a component main body made of a metal plate is formed of a thickened portion, in which a plate thickness of the metal plate as a material of the component main body is gradually increased. Just as described, since the bent portion, on which stress is likely to be concentrated when a load is applied to the component main body, is formed of the thickened portion, a plate thickness of a portion where the stress is not concentrated can be prevented from being (Continued)

increased more than necessary. This can contribute to improvement of mass efficiency.

4 Claims, 21 Drawing Sheets

(51) Int. Cl.
*B21K 23/00* (2006.01)
*B21J 5/08* (2006.01)
*B21D 22/06* (2006.01)
*B62D 25/00* (2006.01)

(58) Field of Classification Search
USPC .......................................................... 72/377
See application file for complete search history.

(56) References Cited

FOREIGN PATENT DOCUMENTS

| | | |
|---|---|---|
| JP | S6112507 U | 1/1986 |
| JP | H0691681 A | 4/1994 |
| JP | H10-316026 A | 12/1998 |
| JP | 2001314921 A | 11/2001 |
| JP | 2002192281 A | 7/2002 |
| JP | 2005349433 A | 12/2005 |
| JP | 2007175765 A | 7/2007 |
| JP | 2015054587 A | 3/2015 |
| WO | WO 2014/065290 A1 * 10/2013 ............. B21D 22/20 |
| WO | 2015/036829 A1 | 3/2015 |

OTHER PUBLICATIONS

Mar. 25, 2015 International Search Report issued in International Patent Application No. PCT/IB2014/002875.

\* cited by examiner

VEHICLE BODY COMPONENT, MANUFACTURING DEVICE OF THE SAME, AND MANUFACTURING METHOD FOR THE SAME

BACKGROUND OF THE INVENTION

1. Field of the Invention

The present invention relates to a component that constitutes a vehicle body such as an automobile, a manufacturing device of the same, and a manufacturing method for the same.

2. Description of Related Art

In a vehicle body front structure that is described in Japanese Patent Application Publication No. 10-316026 (JP 10-316026 A) below, a horizontal surface provided at an upper end of a front suspension tower is provided with a front spring support plate (hereinafter referred to as a suspension tower plate). An outer periphery of this suspension tower plate is bent to incline downward. The outer periphery (an outer peripheral bent portion) overlaps a lower surface of an upper end bent portion of the front suspension tower, and is joined to the lower surface by welding or the like. An upper end of a front suspension is fastened and fixed to this suspension tower plate.

In the vehicle body front structure, which is just as described, the suspension tower plate receives an upward load from a front tire during traveling of a vehicle via the front suspension. For this reason, from a perspective of improving steering stability and riding comfort of the vehicle, it is desired to secure rigidity of the suspension tower plate.

In regard to this point, in the above vehicle body front structure, the outer peripheral bent portion of the suspension tower plate overlaps the upper end bent portion of the front suspension tower, and is joined to the upper end bent portion by welding or the like, as described above. Thus, the outer peripheral bent portion of the suspension tower plate can be reinforced.

However, joining loss occurs at a joined section between the outer peripheral bent portion of the suspension tower plate and the upper end bent portion of the front suspension tower. Accordingly, in order to secure desired strength and rigidity, a measure has to be taken, such as thickening one or both of the suspension tower plate and the front suspension tower. Thus, there is still room for improvement from a perspective of improvement of mass efficiency.

SUMMARY OF THE INVENTION

An aspect of the present invention obtains a vehicle body component that can contribute to improvement of mass efficiency, a manufacturing method therefor, and a manufacturing device thereof.

A vehicle body component according to one aspect of the invention includes: a component main body that is formed of a metal plate and being as a part of a vehicle body; bent portion that are formed in the component main body; and a thickened portion, the bent portion including the thickened portion, and gradually increases a plate thickness of the metal plate toward a center side in a bent direction of the bent portion that the thickened portion itself constitutes.

In the vehicle body component, the bent portion, the bent portion including the thickened portion, bent portion is formed in the component main body made of the metal plate, is formed of the thickened portion, which gradually increases (increases) the plate thickness of the metal plate as a material of the component main body. Just as described, the bent portion, on which stress is likely to be concentrated when a load is applied to the component main body, is formed of the thickened portion. Thus, a plate thickness of a portion where the stress is not concentrated can be prevented from being increased more than necessary. This can contribute to improvement of mass efficiency. In addition, in this thickened portion, since the plate thickness of the metal plate is gradually increased toward the center side in the bent direction of the bent portion, it is possible to prevent occurrence of stress concentration that is caused by an abrupt change in a characteristic of a cross section.

In regard to the vehicle body component, the thickened portion may be thicker than a portion of the metal plate that is other than the thickened portion.

In regard to the vehicle body component, in the thickened portion, the plate thickness of the metal plate may gradually be increased from a position where the bent portion starts being bent toward an apex of the bent portion.

In the vehicle body component, the component main body may be formed in an elongated shape, the component main body may include paired opposing walls that oppose each other in an orthogonal direction to a longitudinal direction of the component main body and a coupling wall that couples between one ends of the paired opposing walls, the bent portions may be provided at portions between the paired opposing walls and the coupling wall, and the thickened portion may be provided in at least one of the bent portion.

In the vehicle body component, when a load in a longitudinal direction of the component main body or a load in the orthogonal direction to the longitudinal of the component main body acts on the component main body, which is formed in the elongated shape, the stress is concentrated on each of the bent portion between the paired opposing walls and the coupling wall. Since the above-described thickened portion is provided in at least one of these bent portion, strength and rigidity of the component main body can efficiently be secured.

In the vehicle body component, the thickened portion may be continuously provided from one end in the longitudinal direction of the component main body to another end in the longitudinal direction of the component main body.

In the vehicle body component, it is possible to prevent occurrence of stress concentration that is caused by an abrupt change in a characteristic of a cross section of the bent portion in an intermediate portion in the longitudinal direction of the component main body.

The vehicle body component may be a suspension tower plate.

The vehicle body component may be a side member inner panel.

The vehicle body component may be a rocker outer panel.

The vehicle body component may be a center pillar outer panel.

A manufacturing device of a vehicle body component that manufactures the vehicle body component includes: a first die that contacts the metal plate formed with the bent portion from an outer side in a bent radial direction of the bent portion, the first die including a first gap between the first die and the bent portion, and a cross section of the first gap being gradually increased toward a center side in a bent direction of the bent portion; a second die that contacts the metal plate from an inner side in the bent radial direction of the bent portion, the second die including a second gap between the second die and the bent portion, and a cross section of the second die being gradually increased toward the center side in the bent direction of the bent portion; a movable die that can pressurize one side portion of the metal plate to the bent portion side in a state that the metal plate is held between the first die and the second die, the one side portion of the metal plate being adjacent to the bent portion; and a device main body that uses the movable die to pressurize the one side portion of the metal plate to the bent portion side in the state that the metal plate is held between the first die and the second die, so as to move a portion of the metal plate to the first gap and the second gap by plastic flow.

In the manufacturing device of a vehicle body component, the metal plate that has the bent portion is held between the second die and the first die. In this state, the first die contacts the metal plate from the outer side in the bent radial direction of the bent portion, and the second die contacts the metal plate from the inner side in the bent radial direction of the bent portion. Then, the first gap, the cross section of which is gradually increased toward the center side in the bent direction of the bent portion, is formed between the first die and the bent portion. The second gap, the cross section of which is gradually increased toward the center side in the bent direction of the bent portion, is formed between the second die and the bent section. In this state, when the device main body uses the movable die to pressurize the one side portion of the metal plate, which is adjacent to the bent portion, to the bent portion side, the portion of the metal plate moves to the first gap and the second gap by the plastic flow. In this way, since the plate thickness of the metal plate can gradually be increased toward the center side in the bent direction of the bent portion, this can contribute to the improvement of the mass efficiency.

A width dimension of the first gap that is along the bent radial direction of the bent portion may gradually be increased from one end of the first gap to an apex of the first gap, or a width dimension of the second gap that is along the bent radial direction of the bent portion may gradually be increased from one end of the second gap to an apex of the second gap.

A cross-sectional shape of the first gap or a cross-sectional shape of the second gap may be a crescent shape.

In the manufacturing device of a vehicle body component, the width dimension of the first gap that is along the bent radial direction of the bent portion may be set to be larger than the width dimension of the second gap that is along the bent radial direction of the bent portion.

In the manufacturing device of a vehicle body component, the first die contacts the metal plate, which is formed with the bent portion, from the outer side in the bent radial direction of the bent portion, and the second die contacts the metal plate from the inner side in the bent radial direction of the bent portion. In this state, the first gap that is formed between the first die and the bent portion has the larger width dimension, which is along the bent radial direction of the bent portion, than the second gap that is formed between the second die and the bent portion.

Here, when the device main body uses the movable die to pressurize the one side portion of the metal plate, which is adjacent to the bent portion, to the bent portion side, the portion of the metal plate is more likely to move to the outer side in the bent radial direction of the bent portion than to the inner side in the bent radial direction of the bent portion by the plastic flow. In this point, in the present invention, the first gap that is formed on the outer side in the bent radial direction of the bent portion is set to have the larger width dimension than the second gap that is formed on the inner side in the bent radial direction of the bent portion as described above. Accordingly, the portion of the metal plate actively moves to the first gap by the plastic flow, so as to increase the rigidity of the bent portion. Then, the portion of the metal plate can move to the second gap by the plastic flow. This can contribute to prevention of unnecessary buckling of the bent portion during the pressurization, which is described above.

In the manufacturing device of a vehicle body component, the second die may include a slide portion that can increase or reduce the width dimension of the second gap that is along the bent radial direction of the bent portion, the device main body may include a load sensor for detecting a reactive force that the movable die receives during pressurization of the one side portion, the movable die may start pressurizing the one side portion of the metal plate in a state that the width dimension is reduced by the slide portion, and the width dimension may be increased by the slide portion when output of the load sensor exceeds a predetermined threshold.

In the manufacturing device of a vehicle body component, the device main body uses the movable die to start pressurizing the one side portion of the metal plate in the state that the width dimension of the second gap is reduced by the slide portion, which is provided in the second die. In this way, the unnecessary buckling of the bent portion to the second gap side can be prevented when the one side portion of the metal plate is pressurized to the bent portion side.

Then, the portion of the metal plate moves to the first gap by the plastic flow, and thus the output of the load sensor exceeds the predetermined threshold. As a result, the device main body uses the slide portion to increase the width dimension of the second gap. Since the rigidity of the bent portion is improved in this state, the portion of the metal plate can move to the second gap by the plastic flow while buckling as described above is prevented. Noted that "reduction" includes a case where the width dimension of the second gap is reduced to zero. In regard to this point, the same applies to "reduction" of the width dimension, which will be described below.

In the manufacturing device of a vehicle body component, the device main body may include the load sensor for detecting the reactive force that the movable die receives during the pressurization of the one side portion. When the pressurization by the movable die causes the portion of the metal plate to move to the first gap by the plastic flow and thus the output of the load sensor exceeds the predetermined threshold, a pressure on the one side portion of the metal plate by the movable die may be increased.

In the manufacturing device of a vehicle body component, as described above, when the device main body uses the movable die to pressurize the one side portion of the metal plate to the bent portion side, the portion of the metal plate is likely to move to the first gap by the plastic flow, the first gap being positioned on the outer side in the bent radial direction of the bent portion. When the portion of the metal plate moves to this first gap by the plastic flow and thus the output of the load sensor exceeds the predetermined threshold, the device main body increases the pressure on the one side portion of the metal plate by the movable die. In this way, the portion of the metal plate can move favorably to the second gap by the plastic flow, the second gap being positioned on the inner side in the bent radial direction of the bent portion (on a side to which the portion of the metal plate is less likely to move by the plastic flow).

In other words, in the present invention, in an initial period that the device main body uses the movable die to start pressurizing the one side portion of the metal plate to the bent portion side, the plate thickness of the bent portion has not been increased, and thus the bent portion is likely to be buckled. Accordingly, the one side portion of the metal plate is pressurized with a low load. This can contribute to prevention of unnecessary buckling of the bent portion. Then, after the bent portion is thickened on the first gap side, and the rigidity of the bent portion is improved, the pressure on the one side portion of the metal plate is increased. In this way, the portion of the metal plate can move favorably to the second gap, to which the portion of the metal plate is less likely to move by the plastic flow, by the plastic flow.

A manufacturing method for a vehicle body component includes: preparing: a first die that contacts a metal plate formed with a bend portion from an outer side in a bent radial direction of the bent portion, the first die including a first gap between the first die and the bent portion, and a cross section of the first gap being gradually increased toward a center side in a bent direction of the bent portion; a second die that contacts the metal plate from an inner side in the bent radial direction of the bent portion, the second die including a second gap between the second die and the bent portion, and a cross section of the second die being gradually increased toward the center side in the bent direction of the bent portion; and a movable die that can pressurize one side portion of the metal plate to the bent portion side in a state that the metal plate is held between the first die and the second die, the one side portion of the metal plate being adjacent to the bent portion; and pressurizing the one side portion to the bent portion side by the movable die in the state that the metal plate is held between the first die and the second die, so as to move a portion of the metal plate to the first gap and the second gap by plastic flow.

In the manufacturing method for a vehicle body component, the metal plate that has the bent portion is first held between the second die and the first die. At this time, the first die contacts the metal plate from the outer side in the bent radial direction of the bent portion, and the second die contacts the metal plate from the inner side in the bent radial direction of the bent portion. In this state, the first gap, a cross section of which is gradually increased toward the center side in the bent direction of the bent portion, is formed between the first die and the bent portion. The second gap, a cross section of which is gradually increased toward the center side in the bent direction of the bent portion, is formed between the second die and the bent portion. In this state, the movable die pressurizes the one side portion of the metal plate, which is adjacent to the bent portion, to the bent portion side, and causes the portion of the metal plate to move to the first gap and the second gap by the plastic flow. In this way, the plate thickness of the metal plate can gradually be increased toward the center side in the bent direction of the bent portion. Thus, this can contribute to the improvement of the mass efficiency.

In the manufacturing method for a vehicle body component, a width dimension of the first gap that is along the bent radial direction of the bent portion may gradually be increased from one end of the first gap to an apex of the first gap, or a width dimension of the second gap that is along the bent radial direction of the bent portion may gradually be increased from one end of the second gap to an apex of the second gap.

In the manufacturing method for a vehicle body component, a cross-sectional shape of the first gap or a cross-sectional shape of the second gap may be a crescent shape.

In the manufacturing method for a vehicle body component, the width dimension of the first gap that is along the bent radial direction of the bent portion may be set to be larger than the width dimension of the second gap that is along the bent radial direction of the bent portion.

In the manufacturing method for a vehicle body component, the first die contacts the metal plate that is formed with the bent portion from the outer side in the bent radial direction of the bent portion, and the second die contacts the metal plate from the inner side in the bent radial direction of the bent portion. In this state, the first gap, which is formed between the first die and the bent portion, has the larger width dimension than the second gap that is formed between the second die and the bent portion, the width dimension being along the bent radial direction of the bent portion.

Here, when the movable die pressurizes the one side portion of the metal plate, which is adjacent to the bent portion, to the bent portion side, the portion of the metal plate is more likely to move to the outer side in the bent radial direction of the bent portion than to the inner side in the bent radial direction of the bent portion by the plastic flow. In regard to this point, in the present invention, the first gap, which is formed on the outer side in the bent radial direction of the bent portion, is set to have the larger width dimension than the second gap, which is formed on the inner side in the bent radial direction of the bent portion, as described above. Accordingly, the portion of the metal plate actively moves to the first, gap by the plastic flow, so as to improve the rigidity of the bent portion. Then, the portion of the metal plate can move to the second gap by the plastic flow. This can contribute to prevention of unnecessary buckling of the bent portion during the pressurization, which is described above.

In the manufacturing method for a vehicle body component, the second die may be provided with a slide portion that can increase or reduce the width dimension of the second gap that is along the bent radial direction of the bent portion, the movable die may pressurize the one side portion of the metal plate to the bent portion side in a state that the width dimension is reduced by the slide portion, and the width dimension may be increased by the slide portion after the portion of the metal plate moves to the first gap by the plastic flow.

In the manufacturing method for a vehicle body component, the movable die starts pressurizing the one side portion of the metal plate to the bent portion side in the state that the width dimension of the second gap is reduced by the slide portion, which is provided in the second die. In this way, the unnecessary buckling of the bent portion to the second gap side can be prevented. Then, after the portion of the metal plate moves to the first gap by the plastic flow, the width dimension of the second gap is increased by the slide portion. The rigidity of the bent portion is improved in this state. Thus, the portion of the metal plate can move to the second gap by the plastic flow while the buckling as described above is prevented.

In the manufacturing method for a vehicle body component according to the invention, a pressure on the one side portion of the metal plate by the movable die may be increased after pressurization of the one side portion to the bent portion side by the movable die causes the portion of the metal plate to move to the first gap by the plastic flow.

In the manufacturing method for a vehicle body component, as described above, when the movable die pressurizes the one side portion of the metal plate to the bent portion side, the portion of the metal plate is likely to move to the first gap by the plastic flow, the first gap being positioned on the outer side in the bent radial direction of the bent portion. After the portion of the metal plate moves to this first gap by the plastic flow, the pressure on the one side portion of the metal plate by the movable die is increased. In this way, the portion of the metal plate can move favorably to the second gap by the plastic flow, the second gap being positioned on the inner side in the bent radial direction of the bent portion (on the side to which the portion of the metal plate is less likely to move by the plastic flow).

In other words, in the present invention, in the initial period that the movable die starts pressurizing the one side portion of the metal plate to the bent portion side, the plate thickness of the bent portion has not been increased, and thus the bent portion is likely to be buckled. Accordingly, the above one side portion is pressurized with the low load. This can contribute to prevention of the unnecessary buckling of the bent portion. Then, after the bent portion is thickened on the first gap side, and the rigidity of the bent portion is improved, the pressure on the above one side portion of the metal plate is increased. In this way, the portion of the metal plate can move favorably to the second gap, to which the portion of the metal plate is less likely to move by the plastic flow, by the plastic flow.

As it has been described so far, the vehicle body component, the manufacturing method therefor, and the manufacturing device thereof according to the present invention can contribute to the improvement of the mass efficiency.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

A description will be made on a vehicle body component 10, a manufacturing device of a vehicle body component 12, and a manufacturing method for a vehicle body component according to a first embodiment of the present invention on the basis of FIG. 1 to FIG. 5.

(Manufacturing Device and Manufacturing Method)

Figure 1:
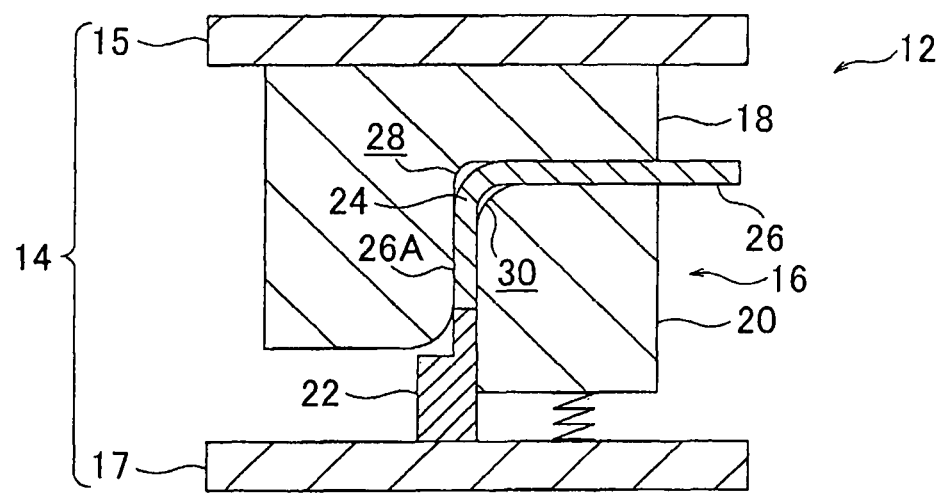
FIG. 1 is a schematic cross-sectional view of a manufacturing device of a vehicle body component according to a first embodiment of the present invention.
Figure 2:
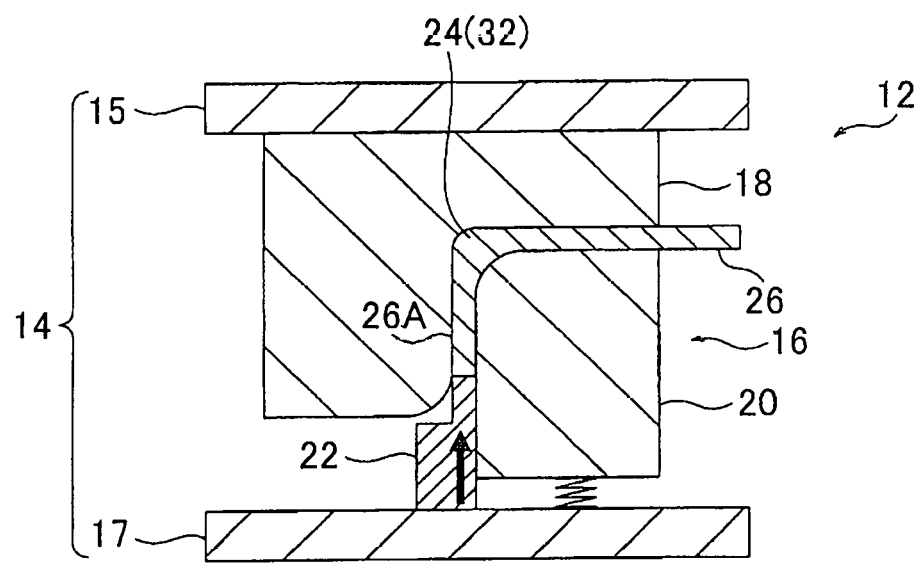
FIG. 2 is a cross-sectional view that corresponds to FIG. 1 and shows a state that a bent portion of a metal plate is thickened by the manufacturing device.

First, the manufacturing device of a vehicle body component 12 (hereinafter, simply referred to as the manufacturing device 12), which is shown in FIG. 1 and FIG. 2, will be described. This manufacturing device 12 is a device for manufacturing the vehicle body component according to this embodiment by using the manufacturing method for the vehicle body component according to this embodiment. This manufacturing device 12 is a device that performs coining, and is configured by including a press machine 14 as a device main body and a press die 16 that is attached to the press machine 14. Noted that the press machine 14 and the press die 16 are schematically illustrated in FIG. 1 and FIG. 2.

The above press die 16 includes a first die 18 that is attached to a bolster 15 side of the press machine 14 as well as a second die 20 and a movable die 22 that are attached to a slide 17 side of the press machine 14. The press die 16 is configured that a metal plate 26 is interposed between the first die 18 and the second die 20, the metal plate 26 being formed with a bent portion 24 (a ridgeline part). This metal plate 26 is formed to have a constant thickness. The bent portion 24 thereof is formed in advance in a separate process.

The first die 18 is configured to contact the above metal plate 26 from the outer side in a bent radial direction of the bent portion 24 and to be formed with a first gap 28 between the first die 18 and the bent portion 24. This first gap 28 is set such that a cross section thereof is gradually increased toward a center side in a bent direction (a center side in a curved direction) of the bent portion 24, and a cross-sectional shape of the first gap 28 is set to a substantially crescent shape. In other words, a width dimension of the first gap 28 that is along the bent radial direction of the bent portion 24 is gradually increased from an end of the first gap 28 to an apex of the first gap 28.

The second die 20 is configured to contact the above metal plate 26 from the inner side in the bent radial direction of the bent portion 24 and to be formed with a second gap 30 between the second die 20 and the bent portion 24. Similar to the first gap 28, this second gap 30 is set such that a cross section thereof is gradually increased toward the center side in the bent direction of the bent portion 24, and a cross-sectional shape of the second gap 30 is set to a substantially crescent shape. In other words, a width dimension of the second gap 30 that is along the bent radial direction of the bent portion 24 is gradually increased from one end of the second gap 30 to an apex of the second gap 30.

The movable die 22 can pressurize (can press) one side portion 26A of the metal plate 26 to the bent portion 24 side in a state that the metal plate 26 is held between the first die 18 and the second die 20, the one side portion 26A being adjacent to the bent portion 24.

The press die 16, which is configured as described above, is pressurized in a vertical direction of FIG. 1 by the press machine 14. Accordingly, the one side portion 26A of the metal plate 26 is pressurized (pressed) to the bent portion 24 side by the movable die 22, and a portion of the metal plate 26 moves to the first gap 28 and the second gap 30 by plastic flow (a state shown in FIG. 2). As a result, a portion that constitutes the bent portion 24 in the metal plate 26 turns into a thickened portion 32 whose thickness is increased (that is thickened) to be thicker than any other portion of the metal plate 26.

In this embodiment, as described above, it is set such that each of the cross sections of the first gap 28 and the second gap 30 is gradually increased toward the center side in the bent direction of the bent portion 24. Accordingly, the above thickened portion 32 is configured that a thickness of the metal plate 26 is gradually increased toward the center side in the bent direction of the bent portion 24. In other words, in the thickened portion 32, the thickness of the metal plate 26 is gradually increased from a position where the metal plate 26 starts being bent to an apex of the bent portion 24.

Noted that, in this embodiment, the width dimension of the first gap 28 that is along the bent radial direction of the bent portion 24 is, for example, set to be the same as the width dimension of the second gap 30 that is along the bent radial direction of the bent portion 24.

(Configuration of Vehicle Body Component)

Figure 3:
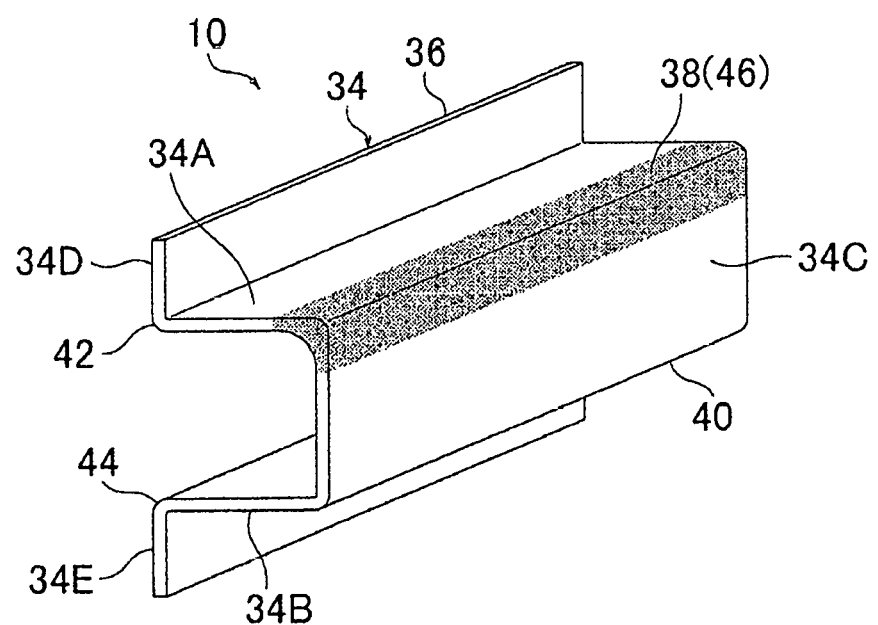
FIG. 3 is a perspective view of the vehicle body component according to the first embodiment of the present invention.
Figure 4:
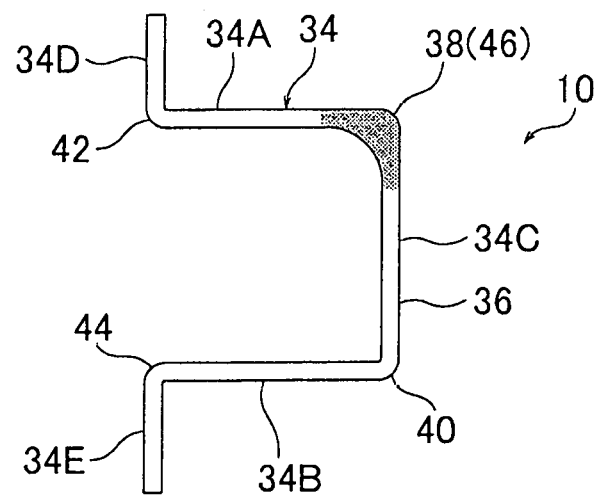
FIG. 4 is a cross-sectional view of the vehicle body component.

FIG. 3 and FIG. 4 show the vehicle body component 10 according to this embodiment (a vehicle frame component herein). This vehicle body component 10 includes a component main body 34 that constitutes a part of a vehicle body (body). This component main body 34 is formed by pressing a sheet of a metal plate 36 with a constant thickness to have a hat-shaped cross section (an open cross section), and is formed in an elongated shape.

This component main body 34 includes paired opposing walls 34A, 34B that oppose each other in an orthogonal direction to a longitudinal direction of the component main body 34. One ends of the paired opposing walls 34A, 34B are integrally coupled by a coupling wall 34C. In addition, paired flange portions 34D, 34E respectively extend from ends of the paired opposing walls 34A, 34B, the ends of the paired opposing walls 34A, 34B is opposite to the coupling wall 34C, paired flange portions 34D, 34E integrally extend in directions to separate from each other.

The above component main body 34 is respectively formed with bent portions 38, 40 between the paired opposing walls 34A, 34B and the coupling wall 34C, and is also respectively formed with bent portions 42, 44 between the paired opposing walls 34A, 34B and the paired flange portions 34D, 34E. Of these bent portions 38, 40, 42, 44 (each of them is a ridgeline part), the bent portion 38, which is formed between the one opposing wall 34A and the coupling wall 34C, is formed of a thickened portion 46. Noted that a portion (a region) where the thickened portion 46 is provided is dotted in FIG. 3 and FIG. 4 for convenience of the description. This thickened portion 46 is thickened by the above-described manufacturing device 12 and has the same configuration as the above-described thickened portion 32. This thickened portion 46 is continuously (seamlessly) provided from one end in a longitudinal direction of the component main body 34 to another end in the longitudinal direction of the component main body 34. In this thickened portion 46, a thickness of the metal plate 36 is increased toward the center side in the bent direction of the bent portion 38.

Noted that, in this vehicle body component 10, the only one bent portion 38 of the four bent portions 38, 40, 42, 44 is formed of the thickened portion 46. However, the present invention is not limited thereto, and each of the other bent portions 40, 42, 44 can be thickened like the thickened portion 46.

(Operations and Effects)

Next, operations and effects of this first embodiment will be described.

In the vehicle body component 10 that is configured as described above, the one bent portion 38 of the four bent portions 38, 40, 42, 44, which are formed in the component main body 34 made of the metal plate, is formed of the thickened portion 46. In the thickened portion 46, the thickness of the metal plate 36, which is a material of the component main body 34, is gradually increased (increased). When a load in the longitudinal direction of the component main body 34 or a load in the orthogonal direction to the longitudinal direction of the component main body 34 acts on this component main body 34, stress is concentrated on each of the bent portions 38, 40, which are respectively located between the paired opposing walls 34A, 34B and the coupling wall 34C. Just as described, the one bent portion 38 of the bent portions 38, 40, on which the stress tends to be concentrated, is formed of the thickened portion 46. Thus, a plate thickness of a portion of the component main body 34 where the stress is not concentrated can be prevented from being increased more than necessary. In this way, strength and rigidity of the component main body 34 can efficiently be secured, and thus it is possible to contribute to improvement of mass efficiency.

Figure 5:
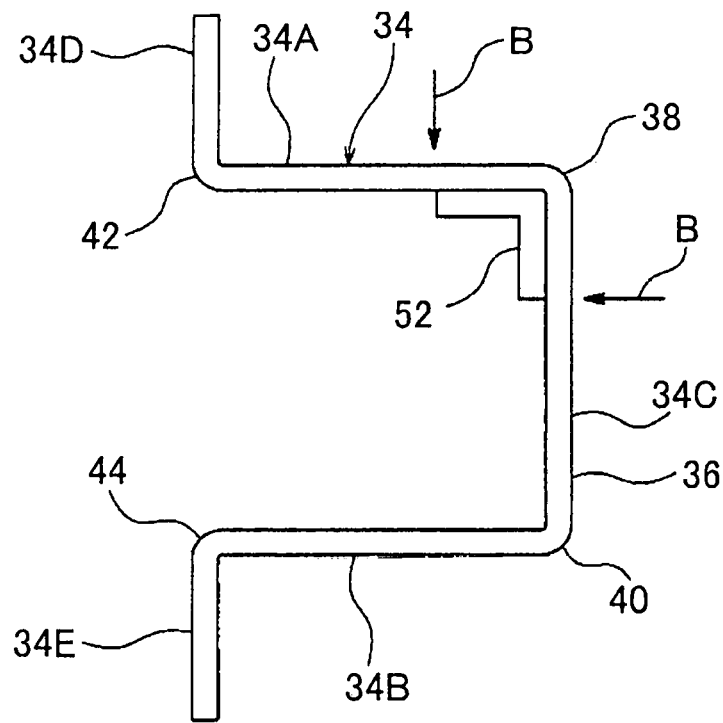
FIG. 5 is a cross-sectional view of a vehicle body component according to a comparative example.

Noted that, as in a comparative example 50 that is shown in FIG. 5, a reinforcing plate 52 (a patch, a reinforcement, or the like) that has an L-shaped cross section is joined to the bent portion 38 and a peripheral portion thereof in the component main body 34 by welding or the like. The bent portion 38 can also be reinforced by such a configuration. However, joining loss occurs at a joined part between the component main body 34 and the reinforcing plate 52. Thus, in order to secure the desired strength and rigidity, a measure, such as thickening of the reinforcing plate 52, needs to be taken, and this results in degradation of the mass efficiency.

In regard to this point, in this embodiment, the thickness of the metal plate 36 itself, which is the material of the component main body 34, is increased in the bent portion 38. Thus, the joining loss as described above does not occur, and only the bent portion, the strength and the rigidity of which are necessary, can efficiently be reinforced. Therefore, it is possible to contribute to the improvement of the mass efficiency.

In addition, in this embodiment, the thickness of the metal plate 36 is gradually increased in the thickened portion 46 toward the center side in the bent direction of the bent portion 38. Thus, it is possible to prevent the stress concentration on the component main body 34 that is caused by an abrupt change in a characteristic of the cross section.

More specifically, in the comparative example 50 shown in FIG. 5, a characteristic of the cross section (the thickness) is abruptly changed at a boundary (see an arrow B in FIG. 5) between a portion where the reinforcing plate 52 overlaps and a portion where the reinforcing plate 52 does not overlap. Accordingly, stress distribution is abruptly changed, and this tends to cause the stress concentration. Thus, the comparative example 50 is inefficient from a perspective of the strength and the rigidity. In regard to this point, in this embodiment, the thickness of the metal plate 36 (the component main body 34) is increased by a continuous thickness change in the bent portion 38. Therefore, it is possible to avoid the stress concentration such as that described above.

Furthermore, in the comparative example 50 shown in FIG. 5, the component main body 34 and the reinforcing plate 52 need to be manufactured separately. Accordingly, the number of dies, machinery facilities, workers, and production time that correspond to the number of components are necessary. In addition, a machinery facility, workers, and production time for joining the component main body 34 and the reinforcing plate 52 are necessary. In regard to this point, in the vehicle body component 10 according to this embodiment, the number of components thereof can be smaller than that of the comparative example 50, and a joining process need not be provided. Thus, this embodiment can contribute to reduction of manufacturing cost and the like.

Moreover, in a configuration that the reinforcing plate 52 is joined to the component main body 34 as in the comparative example 50 shown in FIG. 5, it is difficult to continuously provide the reinforcing plate 52 to both ends in the longitudinal direction of the component main body 34. It is because both of the ends in the longitudinal direction of the component main body 34 are joined to separate components. As a result, the characteristic of the cross section abruptly changes in an intermediate portion in the longitudinal direction of the component main body 34, and this may cause occurrence of the stress concentration. On the contrary, in this embodiment, the thickened portion 46 is continuously provided from one end in the longitudinal direction of the component main body 34 to another end in the longitudinal direction of the component main body 34. Thus, it is possible to prevent occurrence of the stress concentration that is caused by the abrupt change in the characteristic of the cross section of the bent portion 38 in the intermediate portion in the longitudinal direction of the component main body 34.

Next, other embodiments of the present invention will be described. Noted that the configuration and operations that are basically the same as those of the first embodiment are denoted by the same reference numerals in the first embodiment, and the description thereof will not be made.

Second Embodiment

Figure 6:
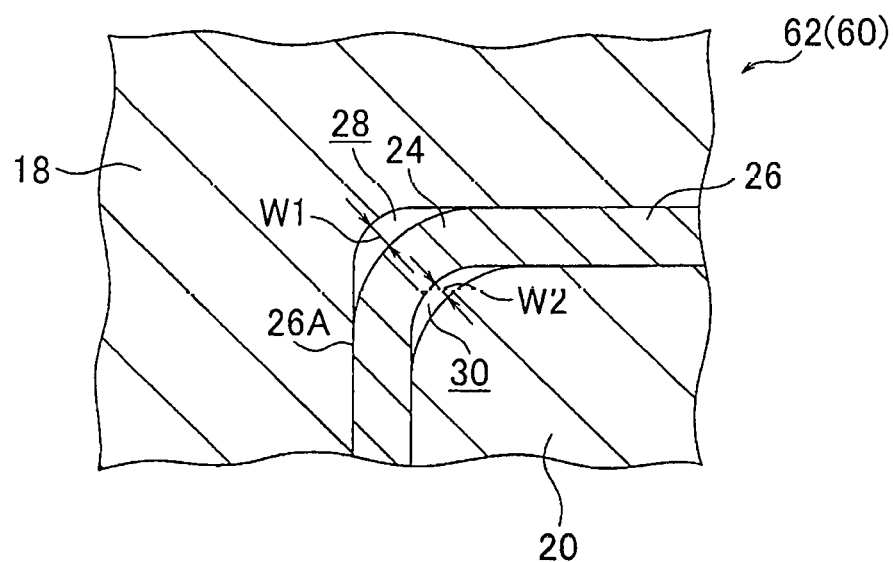
FIG. 6 is a cross-sectional view of a partial structure of a press die in a manufacturing device of a vehicle body component according to a second embodiment of the present invention.

FIG. 6 is a cross-sectional view of a partial configuration of a press die 62 in a manufacturing device of a vehicle body component 60 according to a second embodiment of the present invention. This manufacturing device 60 is a device that carries out a manufacturing method for the vehicle body component according to this second embodiment, and the press die 62 has basically the same configuration as the press die 16 according to the first embodiment. However, in this press die 62, a width dimension W1 of the first gap 28 that is along the bent radial direction of the bent portion 24 is set to be larger than a width dimension W2 of the second gap 30 that is along the bent radial direction of the bent portion 24. Except for what is just described, the configuration of the second embodiment is the same as that of the first embodiment.

Here, when the press machine 14 uses the movable die 22 (both of which are not shown in FIG. 6) to pressurize the one side portion 26A, which is adjacent to the bent portion 24 in the metal plate 26, to the bent portion 24 side, a portion of the metal plate 26 tends to move to the outer side in the bent radial direction of the bent portion 24 by the plastic flow, rather than to the inner side in the bent radial direction of the bent portion 24. In regard to this point, in this embodiment, the width dimension W1 of the first gap 28 that is formed on the outer side in the bent radial direction of the bent portion 24 is set to be larger than the width dimension W2 of the second gap 30 that is formed on the inner side in the bent radial direction of the bent portion 24. Accordingly, the portion of the metal plate 26 actively moves to the first gap 28 by the plastic flow, so as to increase the rigidity of the bent portion 24. Then, the portion of the metal plate 26 can move to the second gap 30 by the plastic flow. This can contribute to prevention of unnecessary buckling of the bent portion 24 during the pressurization, which is described above.

Third Embodiment

Figure 7A:
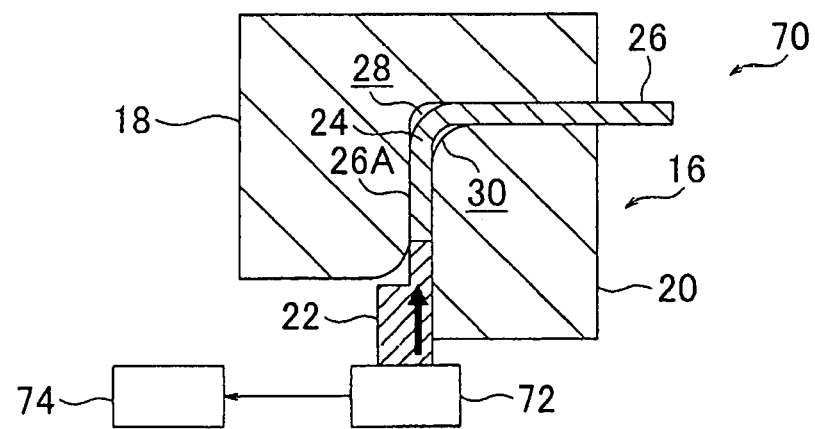
FIG. 7A is a cross-sectional view that corresponds to FIG. 1 and shows an initial state of a metal plate at beginning of pressurization by a manufacturing device of a vehicle body component according to a third embodiment of the present invention.
Figure 8A:
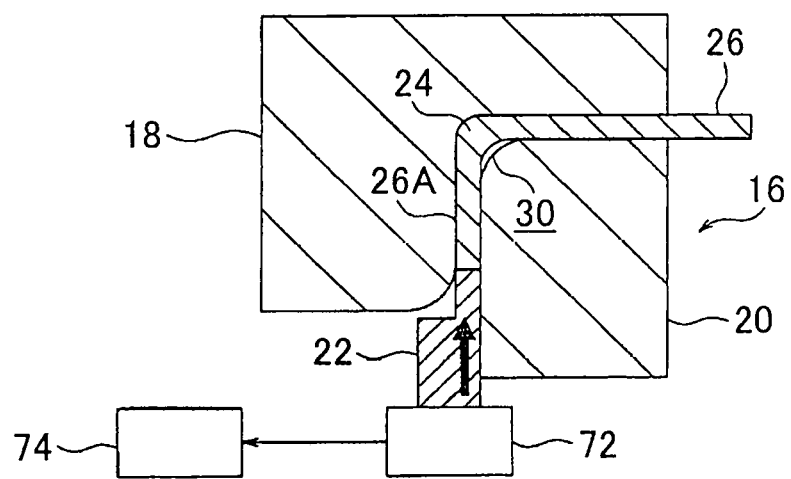
FIG. 8A is a cross-sectional view of a state that the pressurization of the metal plate by the manufacturing device has progressed from the state shown in FIG. 7A and that a portion of the metal plate has moved to a first gap by plastic flow.
Figure 9A:
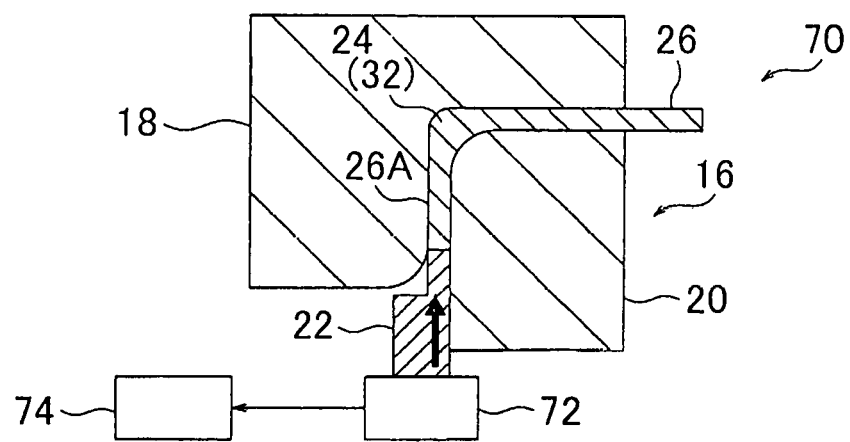
FIG. 9A is a cross-sectional view of a state that the pressurization of the metal plate by the manufacturing device has progressed from the state shown in FIG. 8A and that the portion of the metal plate has moved to a second gap by the plastic flow.

FIG. 7A is a cross-sectional view of an initial state of the metal plate 26 at beginning of pressurization by a manufacturing device of a vehicle body component 70 according to a third embodiment of the present invention. This manufacturing device 70 is a device that carries out a manufacturing method for the vehicle body component according to this third embodiment, and basically has the same configuration as the manufacturing device 12 according to the first embodiment. However, this manufacturing device 70 includes a load sensor 72 for detecting a reactive force that is received by the movable die 22 (for outputting a signal that corresponds to the reactive force) during the pressurization of the one side portion 26A of the metal plate 26. This load sensor 72 is electrically connected to a controller 74 that controls actuation of the press machine 14 (which is not shown in FIG. 7A, FIG. 8A, FIG. 9A).

The controller 74 is configured to increase a pressure on the one side portion 26A by the movable die 22 when the pressurization by the movable die 22 causes the portion of the metal plate 26 to move to the first gap 28 by the plastic flow, and consequently, output of the load sensor 72 exceeds a predetermined threshold. The detail will be described below.

Figure 7B:
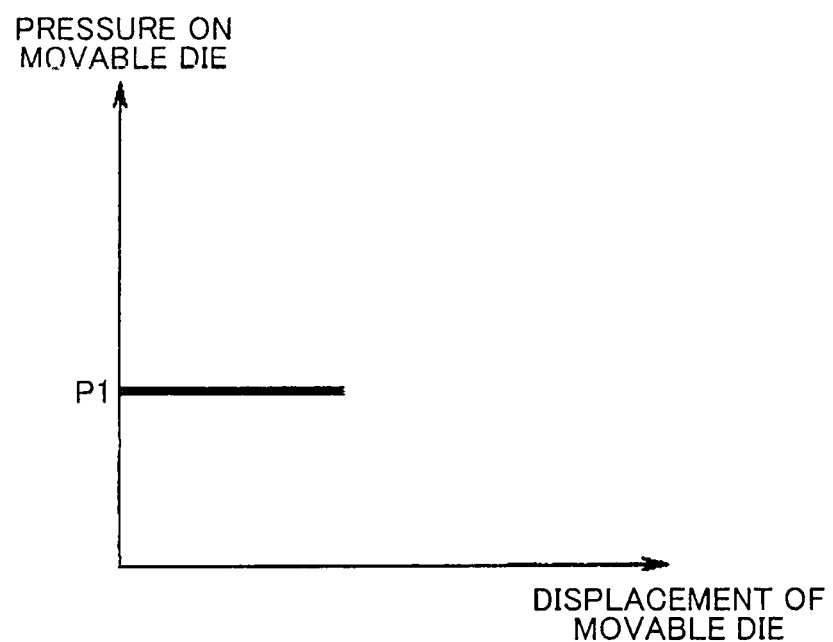
FIG. 7B is a chart of a relationship between a pressure applied to a movable die and displacement of the movable die in the state shown in FIG. 7A.
Figure 7C:
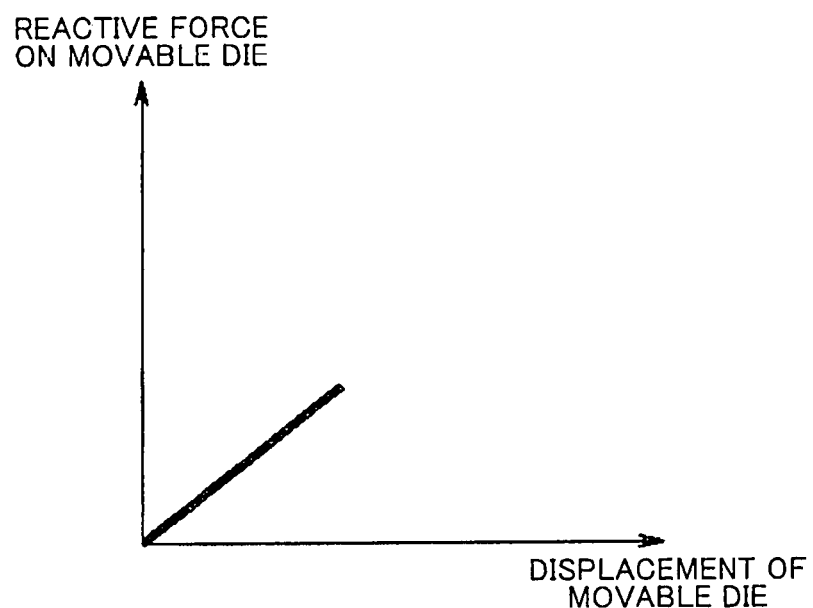
FIG. 7C is a chart of a relationship between a reactive force received by the movable die and the displacement of the movable die in the state shown in FIG. 7A.

As shown in FIG. 7A, when the movable die 22 starts pressurizing the one side portion 26A of the metal plate 26 to the bent portion 24 side, the controller 74 pressurizes the movable die 22 at a constant pressure P1 as shown in FIG. 7B. In this way, as shown in FIG. 7C, a reactive force that the movable die 22 receives from the one side portion 26A increases in accordance with displacement of the movable die 22 to the bent portion 24 side, that is, the plastic flow of the portion of the metal plate 26 to the first gap 28.

Figure 8B:
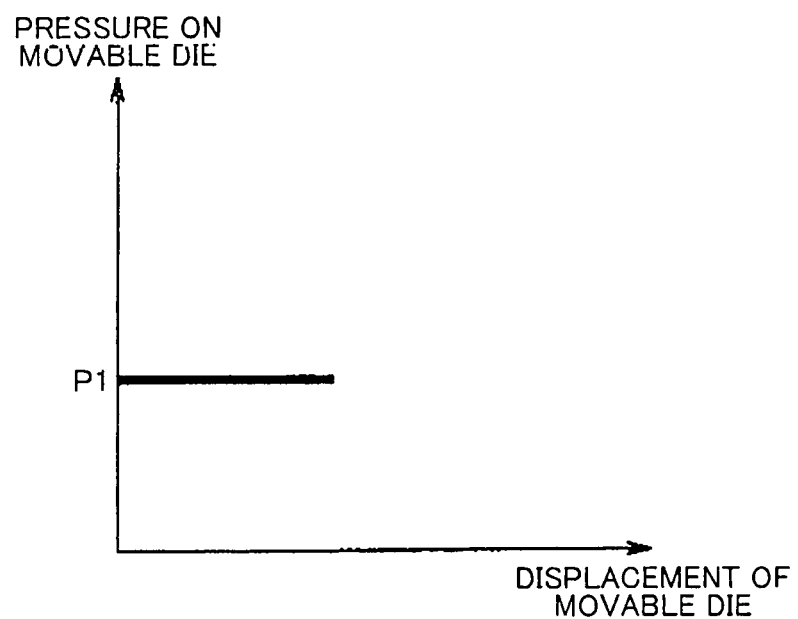
FIG. 8B is a chart of a relationship between the pressure applied to the movable die and the displacement of the movable die in the state shown in FIG. 8A.
Figure 8C:
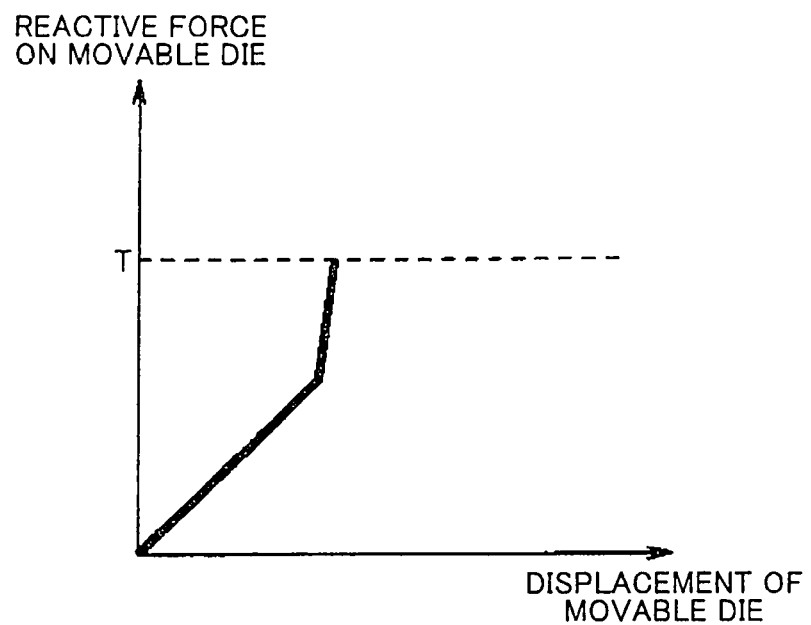
FIG. 8C is a chart of a relationship between the reactive force received by the movable die and the displacement of the movable die in the state shown in FIG. 8A.

As shown in FIG. 8B, the controller 74 applies the constant pressure P1 to the movable die 22 until the above pressurization causes the portion of the metal plate 26 to mostly move to the first gap 28 by the plastic flow. Once the portion of the metal plate 26 moves to the most of the area of the first gap 28 by the plastic flow, as shown in FIG. 8C, the reactive force that the movable die 22 receives from the one side portion 26A is abruptly increased.

Figure 9B:
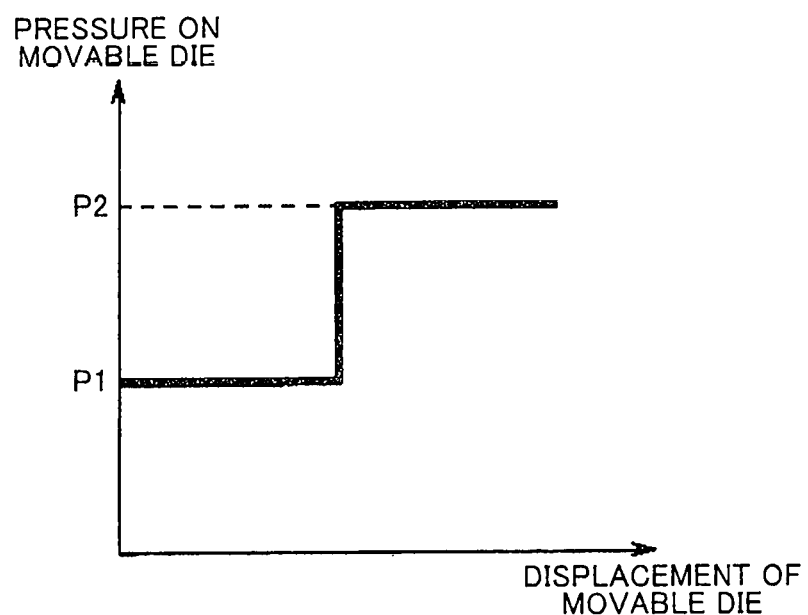
FIG. 9B is a chart of a relationship between the pressure applied to the movable die and the displacement of the movable die in the state shown in FIG. 9A.
Figure 9C:
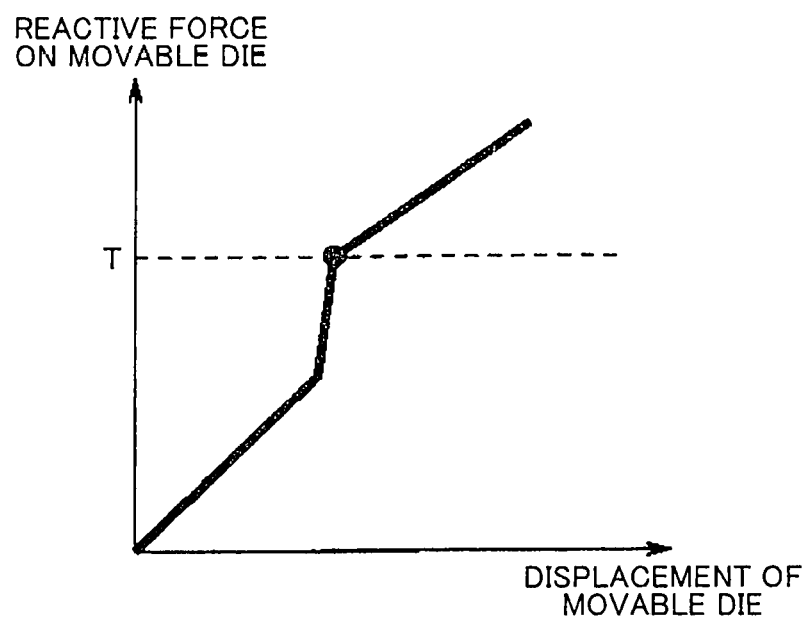
FIG. 9C is a chart of a relationship between the reactive force received by the movable force and the displacement of the movable die in the state shown in FIG. 9A.

As a result, when the output of the load sensor 72 exceeds a threshold T that is set in advance, as shown in FIG. 9B, the controller 74 increases the pressure on the movable die 22 from P1 to P2 (P1<P2). In this way, the portion of the metal plate 26 can move favorably to the second gap 30 by the plastic flow, the second gap 30 being positioned on the inner side in the bent radial direction of the bent portion 24 (on a side to which the portion of the metal plate 26 is less likely to move by the plastic flow). At this time, as shown in FIG. 9C, the reactive force that the movable die 22 receives from the one side portion 26A is increased in accordance with the displacement of the movable die 22 to the bent portion 24 side, that is, the plastic flow of the portion of the metal plate 26 to the second gap 30.

In other words, in this embodiment, in an initial period that the press machine 14 uses the movable die 22 to start pressurizing the one side portion 26A of the metal plate 26 to the bent portion 24 side, the thickness of the bent portion 24 has not been increased, and thus the bent portion 24 is likely to be buckled. Accordingly, the one side portion 26A is pressurized with a low load. This can contribute to the prevention of unnecessary buckling of the bent portion 24. Then, after the bent portion 24 is mostly thickened on the first gap 28 side, and the rigidity of the bent portion 24 is improved, the pressure on the one side portion 26A is increased. In this way, the portion of the metal plate 26 can move favorably by the plastic flow to the second gap 30, to which the portion of the metal plate 26 is less likely to move by the plastic flow.

Fourth Embodiment

FIG. 10A to FIG. 10D are cross-sectional views of a partial configuration of a press die 82 in a manufacturing device of a vehicle body component 80 according to a fourth embodiment of the present invention. This manufacturing device 80 is a device that carries out a manufacturing method for the vehicle body component according to this fourth embodiment, and the press die 82 has basically the same configuration as the press die 16 according to the first embodiment. However, in this press die 82, the second die 20 includes a slide portion 84. This slide portion 84 is attached to be slidable in an arrow S direction in FIG. 10A with respect to the main body portion 86 of the second die 20. This slide portion 84 can increase/reduce the width dimension of the second gap 30 that is along the bent radial direction of the bent portion 24 (can expand/compress the second gap 30).

Figure 10A:
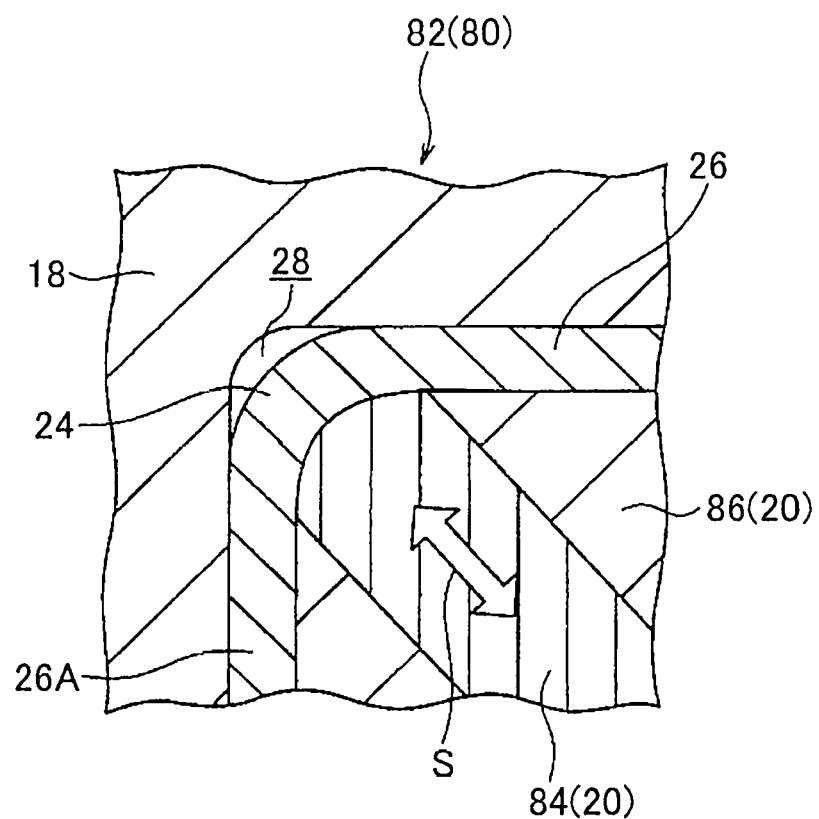
FIG. 10A is a cross-sectional view of a partial structure of a vehicle body component in a manufacturing device according to a fourth embodiment of the present invention.

In addition, this embodiment is provided with the load sensor 72 and the controller 74 (that are not shown in FIG. 10A to FIG. 10D) that are the same as the load sensor 72 and the controller 74 in the third embodiment. A drive source (for example, a cylinder device) that is not shown and can drive the slide portion 84 is connected to this controller 74. This controller 74 uses the drive source to drive the slide portion 84, and thereby reduces the width dimension of the second gap 30 as shown in FIG. 10A (reduces to zero in here). In such a state, the controller 74 starts pressurizing the one side portion 26A of the metal plate 26 by the press machine 14 (which is not shown in FIG. 10A to FIG. 10D). In this way, the portion of the metal plate 26 can move to the first gap 28 by the plastic flow while the unnecessary buckling of the bent portion 24 to the second gap 30 side is prevented.

Figure 10B:
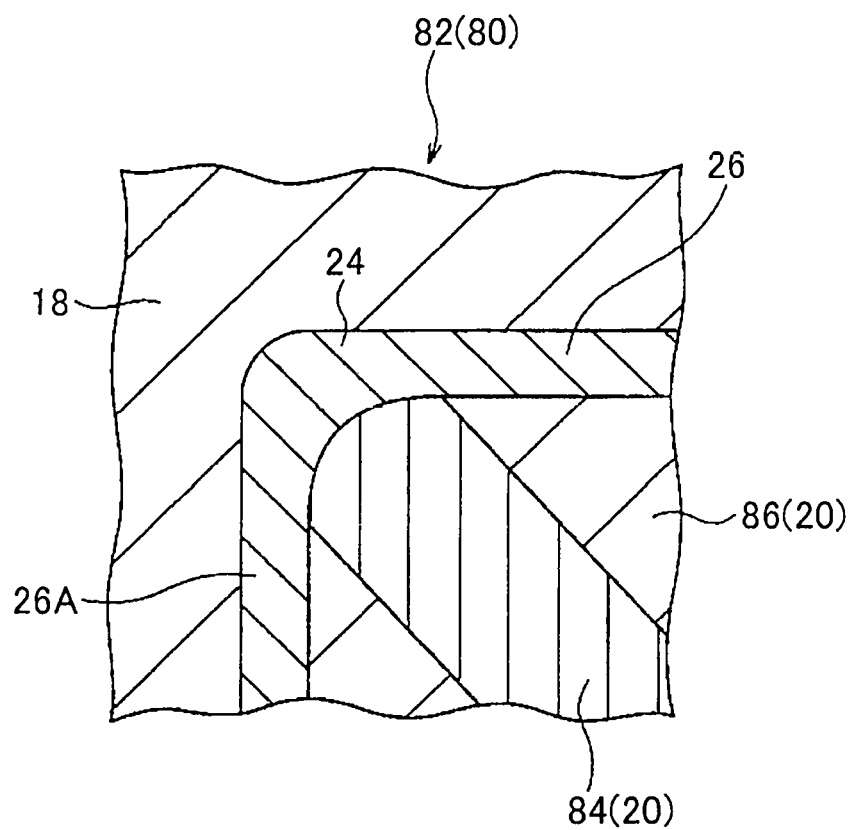
FIG. 10B is a cross-sectional view of a state that a portion of a metal plate has moved to a first gap by plastic flow by pressurization of the metal plate by the manufacturing device.
Figure 10C:
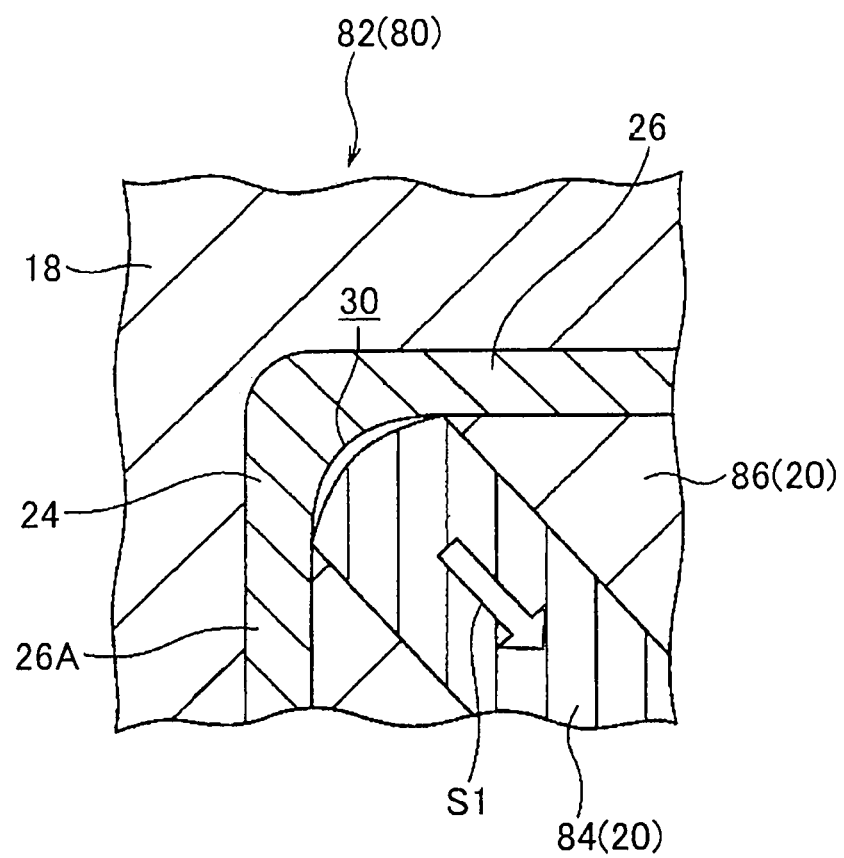
FIG. 10C is a cross-sectional view of a state that a slide portion provided in a second die of the manufacturing device is slid and the second gap is thereby enlarged.
Figure 10D:
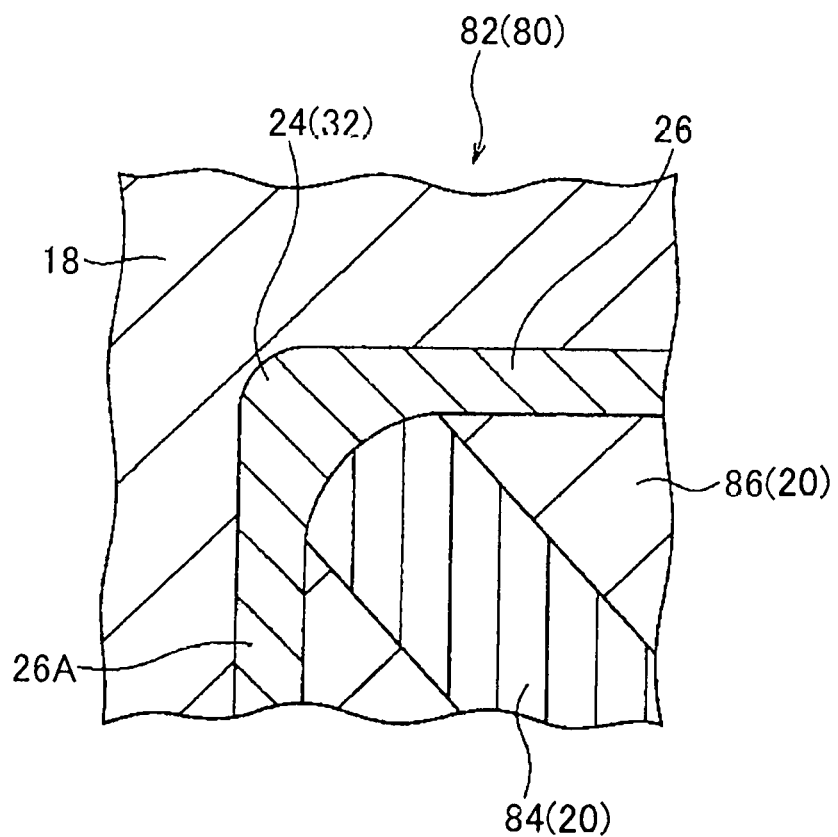
FIG. 10D is a cross-sectional view of a state that the portion of the metal plate has moved to the second gap by the plastic flow.

Then, as shown in FIG. 10B, once the portion of the metal plate 26 moves to the most area of accordance the first gap 28 by the plastic flow, the output of the load sensor 72 exceeds the predetermined threshold. Accordingly, as shown in FIG. 10C, the controller 74 uses the drive source, which is not shown, to slide the slide portion 84 (see an arrow S1 in FIG. 10C), and thereby increases the width dimension of the second gap 30. In this state, the rigidity of the bent portion 24 is improved. Thus, the portion of the metal plate 26 can move to the second gap 30 by the plastic flow while the buckling of the bent portion 24 is prevented (see FIG. 10D).

VARIOUS EXAMPLES OF VEHICLE BODY COMPONENT

Next, a description will be made on various examples of the vehicle body component according to the present invention by using FIG. 11 to FIG. 14. Noted that an arrow FR, an arrow UP, and an arrow OUT, which are appropriately shown in FIG. 11 to FIG. 14, respectively indicate a front direction (a traveling direction), an upper direction, and an outer side in a vehicle width direction of the vehicle.

First Example

Figure 11:
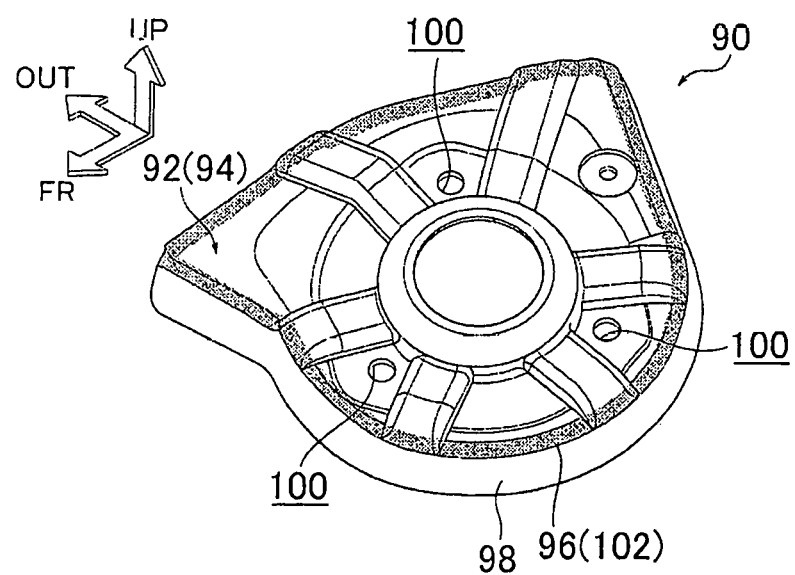
FIG. 11 is a perspective view of an example in a case where the vehicle body component according to the present invention is a suspension tower plate.

FIG. 11 is a perspective view of an example in a case where the vehicle body component according to the present invention is a suspension tower plate. A suspension tower plate 90 that is shown in FIG. 11 constitutes an upper wall portion of a suspension power (not shown) of a vehicle body, and includes a plate main body 92 as a component main body.

The plate main body 92 is formed by pressing a metal plate 94. An outer periphery of this plate main body 92 is formed with a bent portion 96. Accordingly, a flange portion 98 that extends to a lower side is formed. This flange portion 98 is joined to an upper end of a main body of the suspension tower by a means such as welding. It is configured that an upper end of a suspension is bolt-fastened to this plate main body 92 by using plural (three in here) bolt holes 100 that are formed on a center side of the plate main body 92.

The above bent portion 96 is formed of a thickened portion 102 that is thickened by the same manufacturing device as the manufacturing device 12 according to the first embodiment. In this thickened portion 102, a plate thickness of the metal plate 94 is gradually increased toward a center side in a bent direction of the bent portion 96. Noted that a portion (a region) where the thickened portion 102 is provided is dotted in FIG. 11 for convenience of the description.

In the suspension tower plate 90 that is configured as described above, the plate main body 92 receives an upward load from the suspension during traveling of the vehicle, and stress is concentrated in the bent portion 96. Since this bent portion 96 is formed of the thickened portion 102, a plate thickness of a portion of the metal plate 94 where the stress is not concentrated can be prevented from being increased more than necessary. This can contribute to improvement of the mass efficiency.

Second Example

Figure 12:
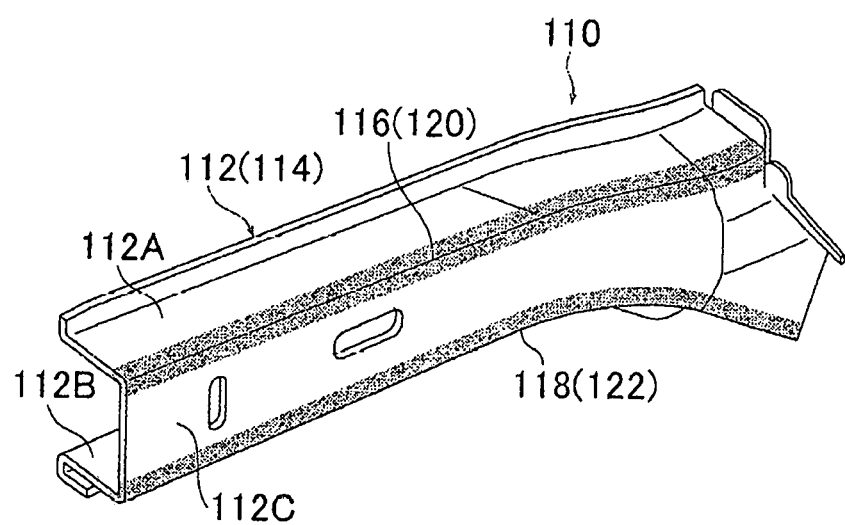
FIG. 12 is a perspective view of an example in a case where the vehicle body component according to the present invention is an inner panel of a front side member.

FIG. 12 is a perspective view of an example in a case where the vehicle body component according to the present invention is an inner panel of a front side member. An inner panel 110 (hereinafter referred to as a side member inner panel 110) that is shown in FIG. 12 includes a panel main body 112 as a component main body. This panel main body 112 is formed by pressing a metal plate 114 to have a substantially hat-shaped cross section, and is formed in an elongated shape.

The above panel main body 112 includes paired opposing walls 112A, 112B that oppose each other in a longitudinal orthogonal direction to a longitudinal direction of the panel main body 112 and a coupling wall 112C that couples between one ends of the paired opposing walls 112A, 112B. Bent portions 116, 118 are respectively formed between the paired opposing walls 112A, 112B and the coupling wall 112C. These bent portions 116, 118 are respectively formed of thickened portions 120, 122 that are thickened by the same manufacturing device as the manufacturing device 12 according to the first embodiment. Noted that portions (regions) where the thickened portions 120, 122 are provided are dotted in FIG. 12 for convenience of the description. These thickened portions 120, 122 are continuously provided from one end in a longitudinal direction of the panel main body 112 to another end in the longitudinal direction of the panel main body 112. In these thickened portions 120, 122, a plate thickness of the metal plate 114 is increased toward the center side in the bent direction of the bent portions 116, 118.

In this side member inner panel 110, when a load in the longitudinal direction of the panel main body 112 or a load in the orthogonal direction to the longitudinal of the panel main body 112 acts on the panel main body 112, which is formed in the elongated shape, such as during a collision of the vehicle, stress is concentrated on each of the bent portions 116, 118 that are respectively located between the paired opposing walls 112A, 112B and the coupling wall 112C. Since these bent portions 116, 118 are respectively formed of the thickened portions 120, 122, rigidity of the panel main body 112 can efficiently be secured. In addition, the thickened portions 120, 122 are continuously provided from the one end in the longitudinal direction of the panel main body 112 to the other end in the longitudinal direction of the panel main body 112. Thus, it is possible to prevent occurrence of the stress concentration that is caused by an abrupt change in a characteristic of the cross section of each of the bent portions 116, 118 in an intermediate portion in the longitudinal direction of the panel main body 112.

Third Example

Figure 13:
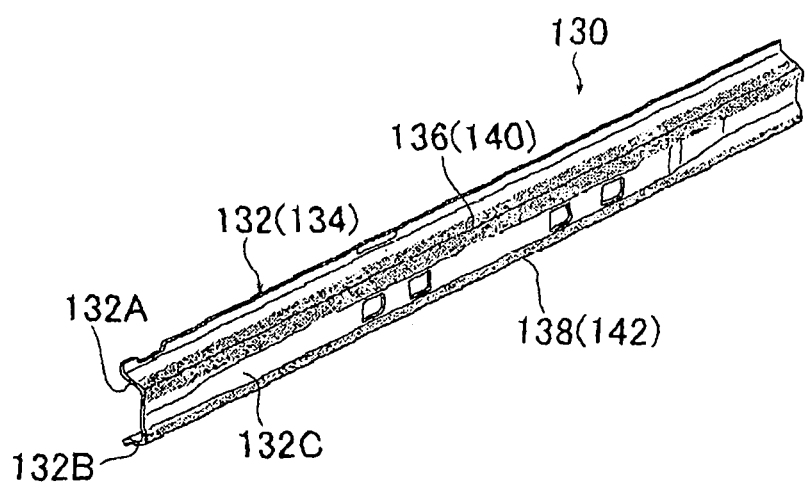
FIG. 13 is a perspective view of an example in a case where the vehicle body component according to the present invention is an outer panel of a rocker.

FIG. 13 is a perspective view of an example in a case where the vehicle body component according to the present invention is an outer panel of a rocker. An outer panel 130 (hereinafter referred to as a rocker outer panel 130) that is shown in FIG. 13 includes a panel main body 132 as a component main body. This panel main body 132 is formed by pressing a metal plate 134 to have a substantially hat-shaped cross section, and is formed in an elongated shape.

The above panel main body 132 includes paired opposing walls 132A, 132B that oppose each other in an orthogonal direction to longitudinal direction of the outer panel 130 and a coupling wall 132C that couples between one ends of the paired opposing walls 132A, 132B. Bent portions 136, 138 are respectively formed between the paired opposing walls 132A, 132B and the coupling wall 132C. These bent portions 136, 138 are respectively formed of thickened portions 140, 142 that are thickened by the same manufacturing device as the manufacturing device 12 according to the first embodiment. Noted that portions (regions) where the thickened portions 140, 142 are provided are dotted in FIG. 13 for convenience of the description. These thickened portions 140, 142 are continuously provided from one end in a longitudinal direction of the panel main body 132 to another end in the longitudinal direction of the panel main body 132. In these thickened portions 140, 142, a plate thickness of the metal plate 134 is gradually increased toward the center side in the bent direction of the bent portions 136, 138. Also, in this example, the same operations and effects as those of the above-described second example can be obtained.

Fourth Example

Figure 14:
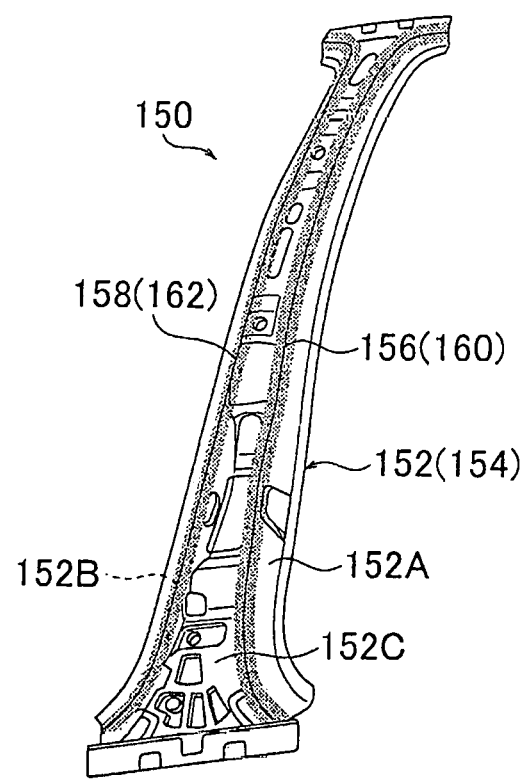
FIG. 14 is a perspective view of an example in a case where the vehicle body component according to the present invention is an outer panel of a center pillar.

FIG. 14 is a perspective view of an example in a case where the vehicle body component according to the present invention is an outer panel of a center pillar (a B pillar). An outer panel 150 (hereinafter referred to as a B pillar outer panel 150) that is shown in FIG. 14 includes a panel main body 152 as a component main body. This panel main body 152 is formed by pressing a metal plate 154 to have a substantially hat-shaped cross section, and is formed in an elongated shape.

The above panel main body 152 includes paired opposing walls 152A, 152B that oppose each other in an orthogonal direction to longitudinal direction of the outer panel 150 and a coupling wall 152C that couples between one ends of the paired opposing walls 152A, 152B. Bent portions 156, 158 are respectively formed between the paired opposing walls 152A, 152B and the coupling wall 152C. These bent portions 156, 158 are respectively formed of thickened portions 160, 162 that are thickened by the same manufacturing device as the manufacturing device 12 according to the first embodiment. Noted that portions (regions) where the thickened portions 160, 162 are provided are dotted in FIG. 14 for convenience of the description. In these thickened portions 160, 162, a plate thickness of the metal plate 154 is gradually increased toward the center side in the bent direction of the bent portions 156, 158. Also, in this example, rigidity of the panel main body 152 can efficiently be secured as in the above-described second and third examples.

The description has been made so far on the present invention by raising several embodiments. However, various modifications can be made to practice the present invention without departing from the scope of the gist thereof. It is needless to say that a range of the right of the present invention is not limited to each of the above embodiments. In addition, the present invention can be applied to other types of the vehicle body component such as a pillar other than the B pillar, a roof side rail, and a cross member.

What is claimed is:

1. A manufacturing method for a vehicle body component, said vehicle body component comprising a component main body as a part of a vehicle body, the component main body being formed of a metal plate and having a bent portion with a thickened portion where a plate thickness of the metal plate is gradually increased toward a center side in a bent direction of the bent portion, the manufacturing method comprising holding a metal plate formed with a bent portion, between a first die and a second die, the metal plate having a constant thickness, whereby the first die contacts the metal plate from an outer side in a bent radial direction of the bent portion while the second die contacts the metal plate from an inner side in the bent radial direction of the bent portion and a first gap is formed between the first die and the bent portion, a cross section of the first gap being gradually increased toward a center side in a bent direction of the bent portion;

providing the second die with a slide portion that can increase or reduce a width dimension of a second gap between the second die and the bent portion of the plate having a constant thickness, along the bent radial direction of the bent portion, pressurizing one side portion of the metal plate to the bent portion side by a movable die in a state that the metal plate is held between the first die and the second die and the width dimension of the second gap is reduced by the slide portion, so as to move a portion of the metal plate to the first gap by plastic flow, the one side portion of the metal plate being adjacent to the bent portion, wherein when pressurizing the one side portion of the metal plate starts so that the portion of the metal plate is moved to the first gap, a width dimension of the first gap that is along the bent radial direction of the bent portion is larger than the width dimension of the second gap that is along the bent radial direction of the bent portion, continuing to pressurize the one side portion of the metal plate to the bent portion side as the width dimension of the second gap is increased by the slide portion after the portion of the metal plate moves to the first gap by the plastic flow, so as to move a portion of the metal plate to the second gap.

2. The manufacturing method for a vehicle body component according to claim 1, wherein the width dimension of the first gap that is along the bent radial direction of the bent portion is gradually increased from one end of the first gap to an apex of the first gap, or the width dimension of the second gap that is along the bent radial direction of the bent portion is gradually increased from one end of the second gap to an apex of the second gap.

3. The manufacturing method for a vehicle body component according to claim 1, wherein a cross-sectional shape of the first gap or a cross-sectional shape of the second gap is a crescent shape.

4. The manufacturing method for a vehicle body component according to claim 1, wherein a pressure on the one side portion of the metal plate by the movable die is increased after pressurization of the one side portion of the metal plate to the bent portion side by the movable die causes the portion of the metal plate to move to the first gap by the plastic flow.

* * * * *